US006825856B1

United States Patent
Fazzio et al.

(10) Patent No.: US 6,825,856 B1
(45) Date of Patent: Nov. 30, 2004

(54) METHOD AND APPARATUS FOR EXTRACTING MEASUREMENT INFORMATION AND SETTING SPECIFICATIONS USING THREE DIMENSIONAL VISUALIZATION

(75) Inventors: Ronald Shane Fazzio, Loveland, CO (US); Dean C Buck, Loveland, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 389 days.

(21) Appl. No.: 09/626,473

(22) Filed: Jul. 26, 2000

(51) Int. Cl.[7] ............................................... G09G 5/00
(52) U.S. Cl. .................. 345/646; 345/647; 345/653; 345/964; 382/141
(58) Field of Search ........................ 345/777, 776, 345/420, 662, 625, 646, 661, 426; 382/149, 150, 154; 700/98, 118, 33, 109, 34, 99, 108; 703/7

(56) References Cited

U.S. PATENT DOCUMENTS

| | | | |
|---|---|---|---|
| 4,926,452 A | 5/1990 | Baker et al. ................... 378/22 |
| 5,199,054 A | 3/1993 | Adams et al. | |
| 5,259,012 A | 11/1993 | Baker et al. | |
| 5,561,526 A * | 10/1996 | Huber et al. ................. 356/376 |
| 5,561,696 A | 10/1996 | Adams et al. | |
| 5,583,904 A | 12/1996 | Adams | |
| 5,621,811 A | 4/1997 | Roder et al. | |
| 5,625,292 A | 4/1997 | Crook et al. | |
| 5,760,596 A | 6/1998 | Peiffer et al. | |
| 5,771,044 A * | 6/1998 | Cragun et al. ............... 345/420 |
| 6,134,674 A * | 10/2000 | Akasheh ....................... 714/33 |
| 6,219,055 B1 * | 4/2001 | Bhargava et al. ........... 345/850 |
| 6,230,066 B1 * | 5/2001 | Sferro et al. ................. 700/104 |
| 6,272,204 B1 * | 8/2001 | Amtower et al. .............. 378/63 |
| 6,330,356 B1 * | 12/2001 | Sundareswaran et al. ... 382/154 |
| 2002/0123812 A1 * | 9/2002 | Jayaram et al. ............... 700/98 |

OTHER PUBLICATIONS

Abdul–Jalil, M. K., Bloebaum, C. L, and Winer, E. H. "Development of a Virtual Visualization Environment for L–S Optimization". American Institute of Aeronautics and Astronautics, Inc., 1998.*
Abdul–Jalil, M. K., Bloebaum, C. L., and Winer, E. H. "Development of a Geographic Independent Virtual Design Environment for a Large–Scale Design". American Institute of Aeronautics and Astronautics, Inc., 1998.*
Silva, Frank. "Real–Time Radiography Automated X–Ray Inspection Strategies". Aug. 3, 1998, Nicolet Imaging Systems, pp. 5–9.*

* cited by examiner

Primary Examiner—John Cabeca
Assistant Examiner—Namitha Pillai

(57) ABSTRACT

The present invention provides an apparatus and method for viewing a depiction of an object (for example a solder joint) in a multi-dimensional manner, morphing the object's depiction using a graphical user interface to upper and lower acceptable tolerance limits and storing the tolerance limits for use in a test/inspection apparatus. The invention relates to the translation of human visual inspection-analysis of an object into physical quantifiable parameters used in an inspection device via a graphical user interface.

19 Claims, 9 Drawing Sheets

METHOD AND APPARATUS FOR EXTRACTING MEASUREMENT INFORMATION AND SETTING SPECIFICATIONS USING THREE DIMENSIONAL VISUALIZATION

BACKGROUND OF THE INVENTION

1. Field of the Invention

The present invention relates to the translation of human visual inspection analysis of an object into physical quantifiable parameters used in an inspection device via a graphical user interface. The present invention further relates to displaying a multidimensional depiction of a manufactured item or classifiable item and then morphing the three dimensional depiction to establish maximum and minimum ranges for various dimensions and aspects of the manufactured item. More particularly, the present invention relates to a method and apparatus for viewing a three dimensional depiction of a solder joint then morphing the depiction of the solder joint to establish maximum and minimum acceptable limits for such solder joint being viewed and tested in a classification/manufacturing test apparatus.

2. Description of Related Art

One goal of inspection processes is to classify a device which is under inspection into one of two (or many) categories based on some criteria (i.e. weight: 3 lbs. or greater is a pass; less than 3 lbs. fails). There are many different types of inspection processes. One type might use a human inspector. Human inspectors are common in visual inspections. Another type of inspection might use a tool, machine or device such as a caliper to measure, for example, an inside diameter of a pipe.

Consider for a moment the contrast between human inspection and tool inspection systems. In a human inspection system the human utilizes human visual and judgment systems. The parameters used to describe or measure an item or object under inspection may include traits such as "smooth", "shiny", "crooked", etc. The traits are fuzzy (not precisely quantified as are physical quantifiable parameters) and are usually distillations (condensations) of a complex (large number of and/or interdependent) set of physical, quantifiable parameters. For example, a trait of a textured surface may be "smoothness". The surface texture, under very close inspection, has thousands of tiny pits, each having five dimensions (three volumetric dimensions, and two positional dimensions). Regardless of the potentially thousands of physical quantifiable parameters required to define smoothness, human visual inspection can quantify the fuzzy trait of smoothness relatively easily. The measures of human visual inspection tend to be inexact (e.g. somewhat, very, or extremely—smooth).

Conversely, a tool measurement system uses substantially only physical quantifiable parameters which are often standardized measures (and in many instances defined by the National Institute of Standards and Technology). Examples of physical quantifiable parameters are length, weight, temperature, frequency, density, etc. The measures of physically quantifiable parameters are generally numeric values (15, 12.5, 0.0026).

Automated inspection systems have become an important part of many production and item inspection facilities. Quality control and the ability to know when a production line is producing good, marginal or poorly manufactured products with respect to predetermined specifications is paramount in today's industrialized/information based society.

An automated test system may test and inspect manufactured objects, such as solder joints, using cross-sectional x-ray imaging or laminography. Such a system may detect defects in solder joints on printed circuit board assemblies (PCBA's) that are single sided or doubled sided. Two-dimensional x-ray views are taken of the board. The testing and inspection is non-destructive because physical contact with the object of inspection is not required.

Drawbacks of automated test equipment tend to be related to the set-up and the programming of the equipment. For example, a set-up and programming processes for a test/inspection machine may be as follows: First the limits must be set. As such, a programmer obtains a "good" reference "item" (e.g. PCBA) to be tested. Then the programmer utilizes a test/inspection device and obtains the device's reported parameters. The parameters are usually reported as numerals which represent different parameters of an "object". The programmer then estimates how much the numerical parameters can vary on the object and be within tolerance. Numerical parameter estimation is a determination of physical dimension tolerance limits which are utilized by an inspection machine. The programmer is effectively setting appropriate tolerance limits for the physical dimensions of the object. Commonly, two numbers are estimated and manually input for each parameter by the programmer. The two numbers may be for an upper and lower limit. When an object, such as a solder joint, has many parameters and physical dimensions (e.g. more than 50) and when there are multiple objects (types and subtypes) on an item for inspection (e.g. PCBA), then a programmer may have to make hundreds of estimations in order to set-up and program a test/inspection machine. The programmer must manually enter the estimations into the test/inspection database for the item.

In order to verify the limits estimated and entered by the programmer, the programmer may run a series of items through the test/inspection device. The test/inspection device will measure and extract parameters of objects on the item and compare the extracted measurements against the estimated limits entered by the programmer. Any extracted measurment that is outside the estimated limits will be indicated as "failed". Any extracted measurement that is inside the estimated limits is indicated as "passed". The programmer will then visually inspect the objects (solder joints) to determine if the entered estimates are classifying the objects correctly. In many instances the estimates do not correctly classify the objects.

The programmer must adjust the appropriate limits if entered estimates do not classify the object correctly. To do so, the programmer looks at the object's shape to determine what parameter(s) of the object is causing the object to be classified incorrectly. Then the programmer must determine (usually guess based on experience) which estimated limit should be adjusted. Sometimes this is a fairly straight forward process when there is a one-to-one relationship between the parameter and the estimated limit (e.g. width of an object and the number describing the width of the object). Other times, this process of "guessing" is not straight forward when multiple parameters interact (e.g. slope, position, and height of an edge). The programmer now must re-estimate how much to change the value of the estimated limit(s).

This process of setting-up and programming a test/inspection machine has various problems. Such problems include that it is tedious and slow. There are a lot of entries to understand and make. This process is highly subjected to human error, human repeatability errors, and human fatigue errors. This process further has the drawback of requiring the programmer to have a cognitive ability to relate physical parameters (e.g. related to shape) to numerical parameters. This is very difficult when a human must visualize 10 or more parameters simultaneously.

Another drawback is that the programmer must translate the visual form (or deformity) to a parameteric value. Furthermore, due to the programming process being tedious and difficult, many programmers "give up" before the system is well programmed or tuned. Also, even if a system is well tuned, operators may believe that the limits are not set correctly and therefore allow out of spec parts to "pass" inspection.

With laminography a two-dimensional view of, for example, a solder joint can be taken. The two-dimensional data can be turned into a plurality of data files and then manipulated manually, by a system programmer, to set maximum and minimum dimensions or tolerances for the inspection/test device to utilize.

The system programmer takes the standard or ideal dimensions for a manufactured item, such as a solder joint, and by hand manually enters numbers or data to set the maximum, minimum, threshold, dimension, and or tolerance information into a data base. The data base is then used by an inspection machine to inspect objects, such as solder joints to determine whether they are within or outside of the programmer defined estimated limits.

For any object, such as a solder joint, ball bearing, plastic part, glass part, mechanical part, rock, piece of fruit or wood etc., there are a plurality (from 1 to more than 100 in some cases) dimensions and tolerances that must be measured by automated test and inspection equipment.

In another exemplary example of setting up a testing/inspection device for a printed circuit board, a programmer using prior art techniques, may be attempting to program an application which inspects a number of solder joints on a given circuit board. There may be a variety of different types of solder joints on the board (gullwing, ball joint, resistor lead, etc.). The gross structural requirements of two gullwing solder joints may be different due to lead size, current, load, heat capacity, etc. Thus, there are "subtypes" of each solder joint type. A programmer may have to manually set up data for many different types of solder joints. Again, this is a long, tedious and prone to error programming process. Once the data (specifications, tolerance, thresholds, dimensions, estimated limits, etc.) are all stored in data files and possibly output through a reporting data file, the programmer may have to go back into the data to change or alter the data by hand and then rerun tests of the data being utilized by the inspection/test machine to determine how close all the data is to an acceptable "physical" inspection or test of the solder joints on a printed circuit board.

The data is manually adjusted by entering numeric data. Actual PCBA's are run through the inspection/test machine to determine if the minimum/maximum threshold and/or tolerance data is in actuality acceptable. Then, the setup process is repeated until the data is acceptable. This process is timely, somewhat trial and error based, and manually intensive to perform.

What is needed is a more automated and less manualy intensive technique for conveying data information for all the different dimensions, tolerances, thresholds and specification data related to a manufactured object into an inspection system such that the operator of the system can perform the task in less time and with a higher resulting accuracy.

SUMMARY OF THE INVENTION

The embodiment of the present invention overcomes drawbacks of prior art systems by utilizing a graphical user interface to combine a human inspection system and analysis with the quantitative repeatability of an automatic inspection system which utilizes physical quantitative parameters associated with an object under inspection.

The present exemplary embodiments of the present method and apparatus for extracting measurement information and setting specifications using multidimensional visualization overcomes the drawbacks of prior systems and methods by providing a multidimensional depiction of an object to be inspected on a display screen. The multidimensional dimensional depiction on the display screen can be visually morphed to depict maximum and minimum tolerances. The user can select and set maximum and minimum tolerances, settings, thresholds, dimensions, etc. on the multidimensional image. Preferably, the image is depicted in three or more dimensions. The selected maximum and minimum settings can then be extracted from the image by the system and stored in data files to be utilized by the automated inspection system.

BRIEF DESCRIPTION OF THE DRAWINGS

Various objects and advantages of this invention will become apparent and more readily appreciated from the following description of the presently preferred exemplary embodiments, taken in conjunction with the accompanying drawings, of which.

DETAILED DESCRIPTION OF THE PREFERRED EXEMPLARY EMBODIMENTS OF THE PRESENT INVENTION

The present invention will now be described more fully hereinafter with reference to the accompanying drawings, in which preferred exemplary embodiments of the present invention are shown. This invention may, however, be embodied in many different forms and should not be construed as limited to the embodiments set forth herein; rather, these embodiments are provided so that this disclosure will be thorough and complete, and will convey pertinent aspects of the invention.

Unlike prior inspection systems, which burden a programmer to translate desired visual features of an object into physical quantifiable parameters, the exemplary embodiments of the present invention provide an apparatus and process that performs the translation from human terms into physical quantifiable parameters.

Figure 8:
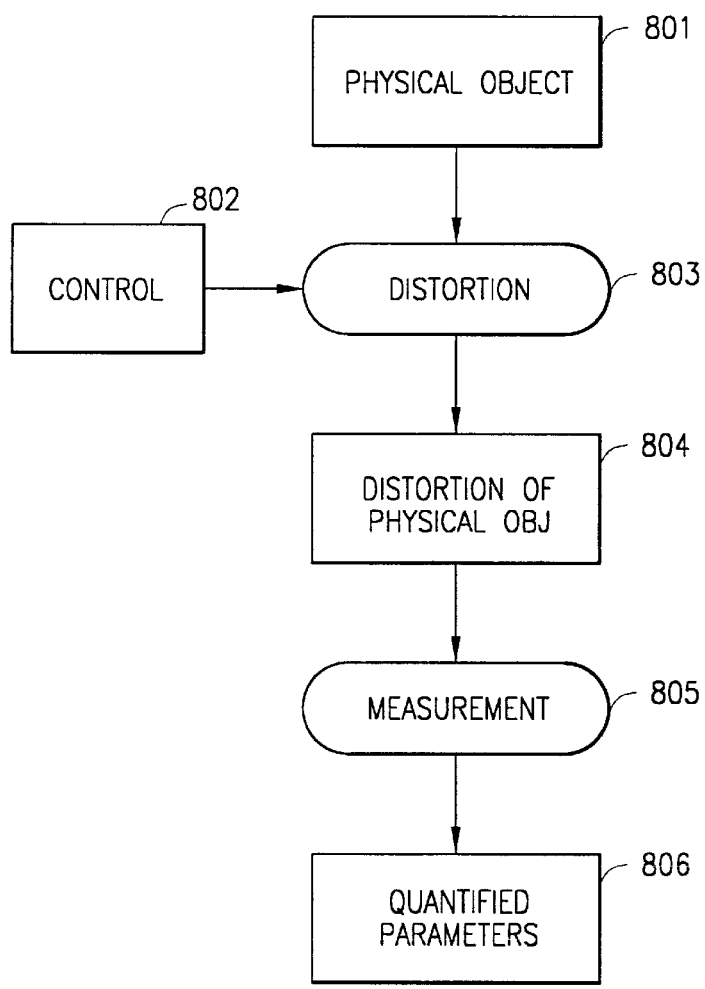
FIG. 8 depicts an exemplary method of obtaining quantified parameters.

Referring now to FIG. 8, and by way of example, suppose a physical object 801 such as a piece of pipe is to be inspected and a programmer wanted to program an inspection machine by utilizing a sample piece of pipe. The programmer may mechanically distort the pipe 803 via a controlled technique 802. The pipe may be distorted from a maximum limit to a minimum limit. The distorted pipe 804 can have measurements extracted 805. For example, inside maximum and minimum diameters of the pipe can be measured. The measurements could then be stored as criteria for physical quantifiable parameters.

It is understood the continuously distorting/contorting of a physical object may be difficult in the "real world". By using a computer with graphics capability, a depiction or image of an object can be easily distorted in accordance with embodiments of the present invention. An inspection tool programmer can be presented with a depiction of an object. The programmer can graphically distort/contort the depiction of the object to, for example, maximum and minimum limits. Each of the maximum and minimum limits may represent a criteria. The depiction can be measured via a graphical program in order to obtain values for the criteria in the form of physical quantifiable parameters. As such, a graphically described image is distorted to aid a programmer to set inspection physical parameters for an inspection device. The programmer, in effect, is setting the inspection physical parameters using human visual 'fuzzy' trait parameters.

Figure 9:
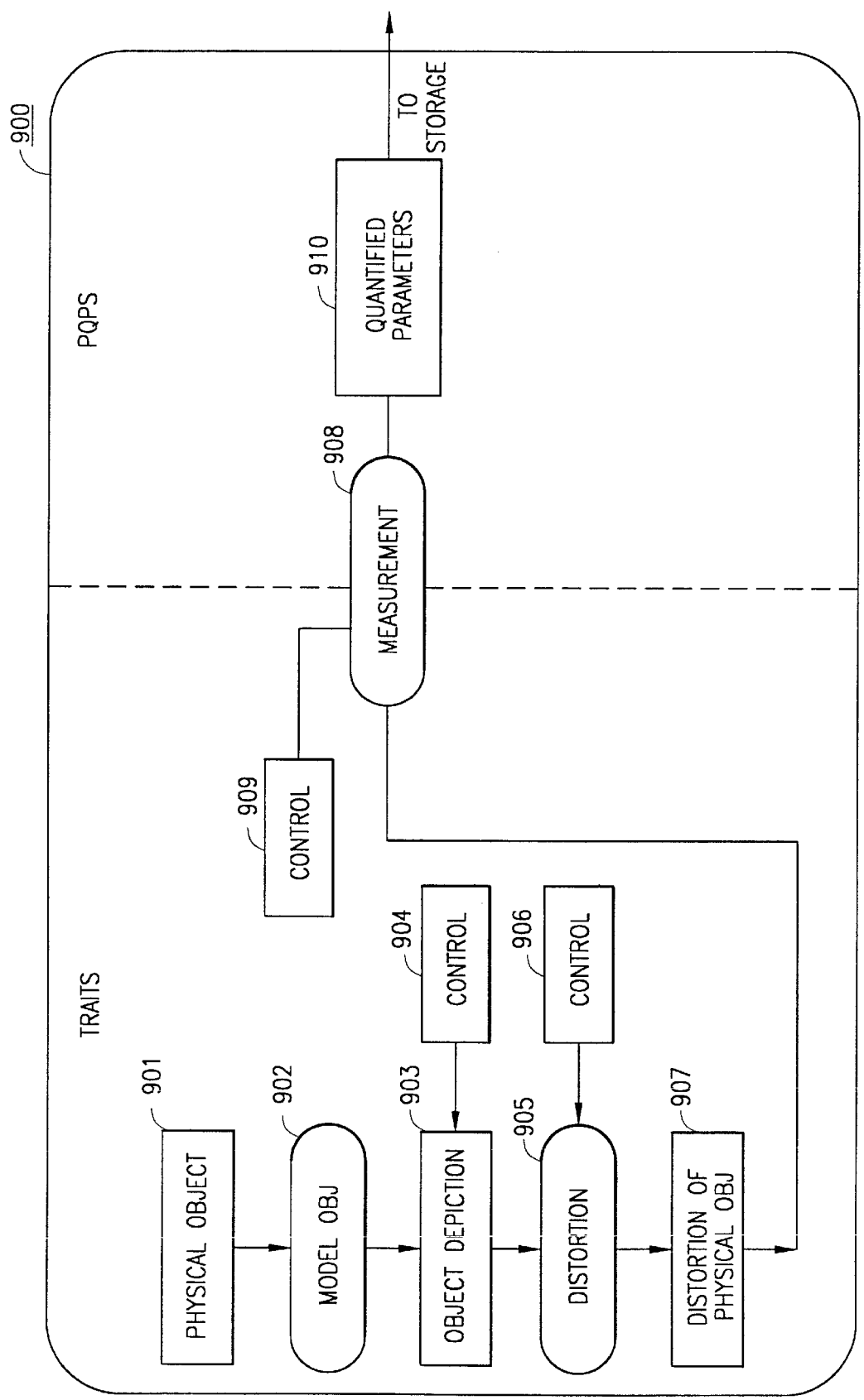
FIG. 9 depicts an exemplary method of obtaining quantified parameters in accordance with the present invention.

Referring now to FIG. 9, an exemplary programming process 900 is described. A physical object 901 is modeled by any number of modeling techniques. For example, the physical object can be modeled by 1) simulation techniques which generate the model by computer using algorithms; 2) analytical techniques which generate the model by using mathematical equations; 3) learned techniques wherein the model is extracted from measuring a physical object; 4) standard based data wherein the model is created by a body of standards using predefined criteria.

The modeled object is then depicted 903 or shown to the programmer using any number of or types of display techniques. An exemplary embodiment uses a computer monitor. The programmer, using controls 904, can select a feature of the depicted object, for example select the solder amount, or lead length. The programmer, using controls 906 can distort or morph the selected depicted object feature to yield a distorted object depiction 907. Note that 907 and 903 are different depictions of the same object. The distortion method 905 is such that it emulates what might occur in the real world. The distorted depiction 907 is distorted until the programmer determines that the distortion matches what the programmer has determined are limits or preferred ranges of an acceptable, "passable" physical object. The programmer may use control 909 to command the machine to measure 908 the physical quantifiable parameters of the distorted depicted object to thereby yield values (numeric) for the physical quantifiable parameters which can be stored as limit criteria. Notice that the translation from human terms (e.g. 'extremely' wide) to machine terms (0.50 mils at location a; 0.30 mils at location b) is done by the measurement process 908. The programmer repeats steps 903 through 909 for the various necessary object features.

An exemplary embodiment may utilize one or more different measurement processes in 908. One measurement process of a depicted distorted/morphed object could utilize a modeling engine such as a solid modeling kernel that allows extraction of the geometric information from the depicted object such as point locations and creates relationships between point locations by utilizing distance and vectors.

Another exemplary measuring process may employ both a geometric representation and corresponding data set for predetermined objects. The data set may include all the necessary relationary information to aid in the determination of physical quantifiable parameters. Distortion and/or morphing of a geometrical depiction occurs in conjunction with a synchronized distortion of the data set. Physical quantifiable parameters are then extracted from the data set as opposed to measured from the geometric representation.

In an exemplary embodiment, morphing of a solder joint depiction is correlated with an interpolation between elements of a data set that corresponds to the quantifiable parameters. The setting of the quantifiable parameters (i.e. selection of threshold (maximum/minimum) limits) occurs through extraction of the interpolated values in the data set.

For exemplary purposes the focus of the following exemplary embodiments will be on the inspection of solder joints found on assembled or manufactured printed circuit boards. It is understood the embodiments of the present invention can be incorporated into systems that inspect natural items like oranges or gem stones, as well as, man made or machine made items like mechanical or electrical devices or clothing. Solder joints, when manufactured, are generally not identical to one another but as a whole are desired to have characteristics which fall within desirable predetermined limits. Various other manufacturing processes, ranging from types of welding to the manufacturing of chocolate chips, to the extrusion of glass, to the growth of crystals, also produce products that need to fall within desirable predetermined acceptable limits and specifications. Furthermore, an inspection process may include x-ray, infrared, ultraviolet, or any other form of radiation, thermal, visual, acoustical, or another viewing or inspection process utilized to set up a testing or imaging system of a product or object that has been manufactured.

Figure 1:
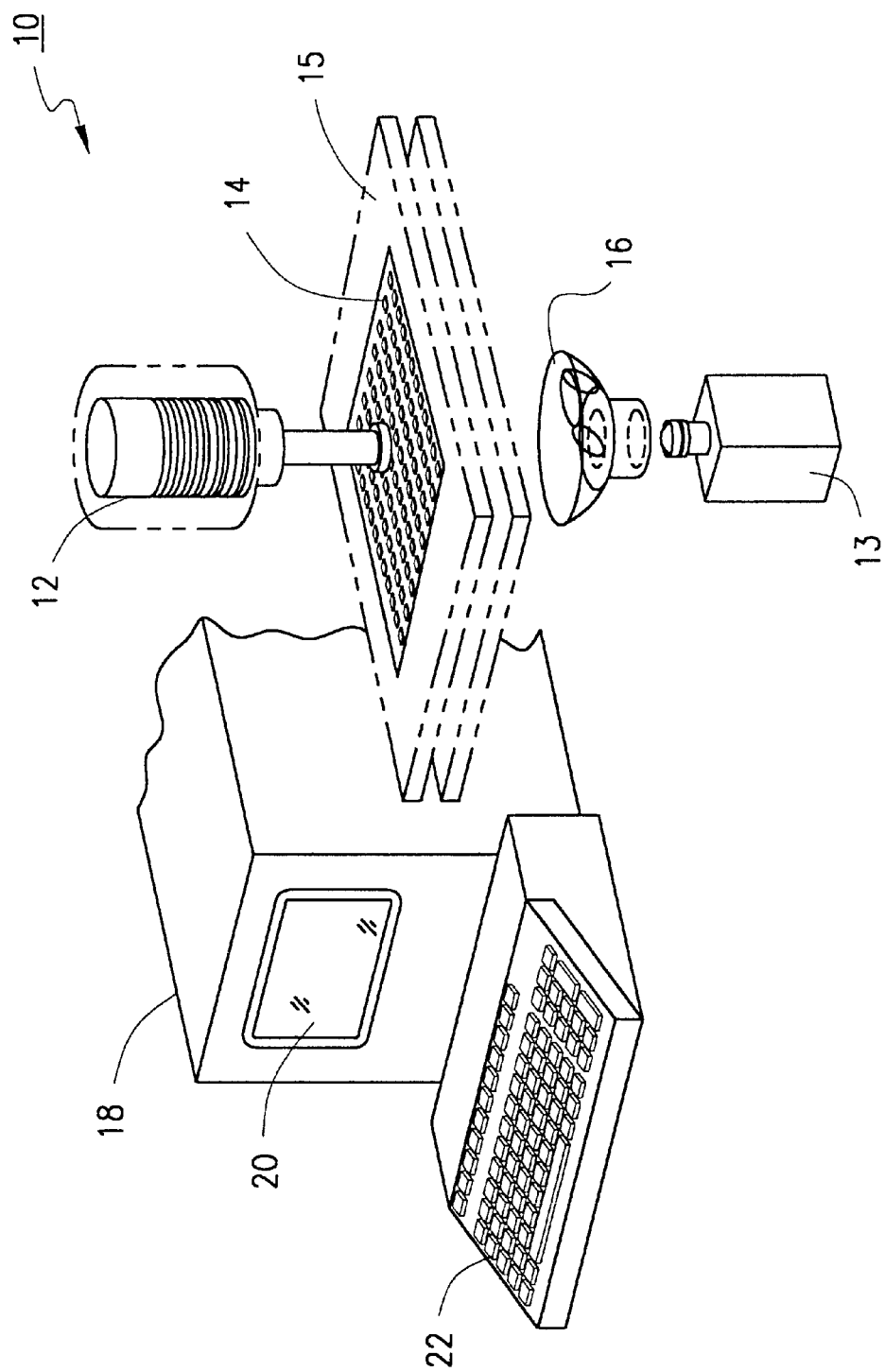
FIG. 1 depicts a perspective view of an exemplary embodiment of the present invention.

At present, the discussion will be directed toward the inspection of solder joints, but by no means limits this invention to such. FIG. 1 depicts an exemplary perspective view of an apparatus in accordance with the present invention. The exemplary apparatus 10 for extracting measurement information of an object and setting specifications for inspecting the object using three dimensional visualization is shown. The imaging portion of the device comprises three elements. A source item 12, a sensor item 13, and a scintillator item 16 (which converts energy generated by the source to energy detected by the sensor) which may not be needed in all cases. Possible source items 12 could generate x-ray, visible light, ultraviolet light, thermal gradients, or acoustical waves, etc. Possible sensors include cameras, CCD, acoustical sensors or temperature sensors, etc. Furthermore, possible overall systems include radiography, MRI, acoustic, or thermal systems etc.

The circuit board 14, in this embodiment, rests on a viewing table 15 which is movable or rotatable. The source device 12, sensor 13 and scintillator 16 can each be movable so that they can be positioned about various portions of the circuit board 14. Imaging device sensor 13 can be placed under the circuit board 14 in order to receive radiation from the source device 12 (if it is, for example, an x-ray device).

A computer system 18 having memory (not specifically shown) for programs and data files also includes an operator station having a display screen 20 and at least a key board and pointing system 22. The computer system provides an input/output capability for controlling the functions of the exemplary invention 10 as well as for communication of inspection data to an operator.

Substantially anything that is manufactured, grown, collected, etc., such as a solder joint, an orange, or diamonds respectively, may need to be tested or inspected. The exemplary apparatus 10 can inspect these items/objects in a non-destructive way. For example, an image of the solder joint is created by using the viewing device/system 12 & 13 (e.g. radiography or MRI system). The technique of imaging the object may not be critical to the invention. The imaging technique provides multidimensional and preferably a three-dimensional ("3D") image representation of the object and repeatable dimensional measurement data. Furthermore, the imaging system may provide the means for creating an image of an object that can be morphed to depict the desired pass/fail boundaries. Once a 3D image of the solder joint (or object) is created, the present exemplary apparatus 10 can be utilized to set a variety of tolerances for future viewed objects.

It is noted that the 3D image can be created from simulated data generated by means other than an actual object. Such a simulated object can be generated using a 3D drawing software package or mathematical techniques.

In order to test or inspect a physical solder joint or a plurality of solder joints, a programmer must first set the thresholds or maximum/minimum limits for each solder joint to be inspected. Once the rejection (or acceptance) thresholds are set, the exemplary apparatus can "automatically" image a plurality of physical solder joints, make appropriate measurements and determine if any of the solder joints are outside the maximum/minimum limits.

Figure 2:
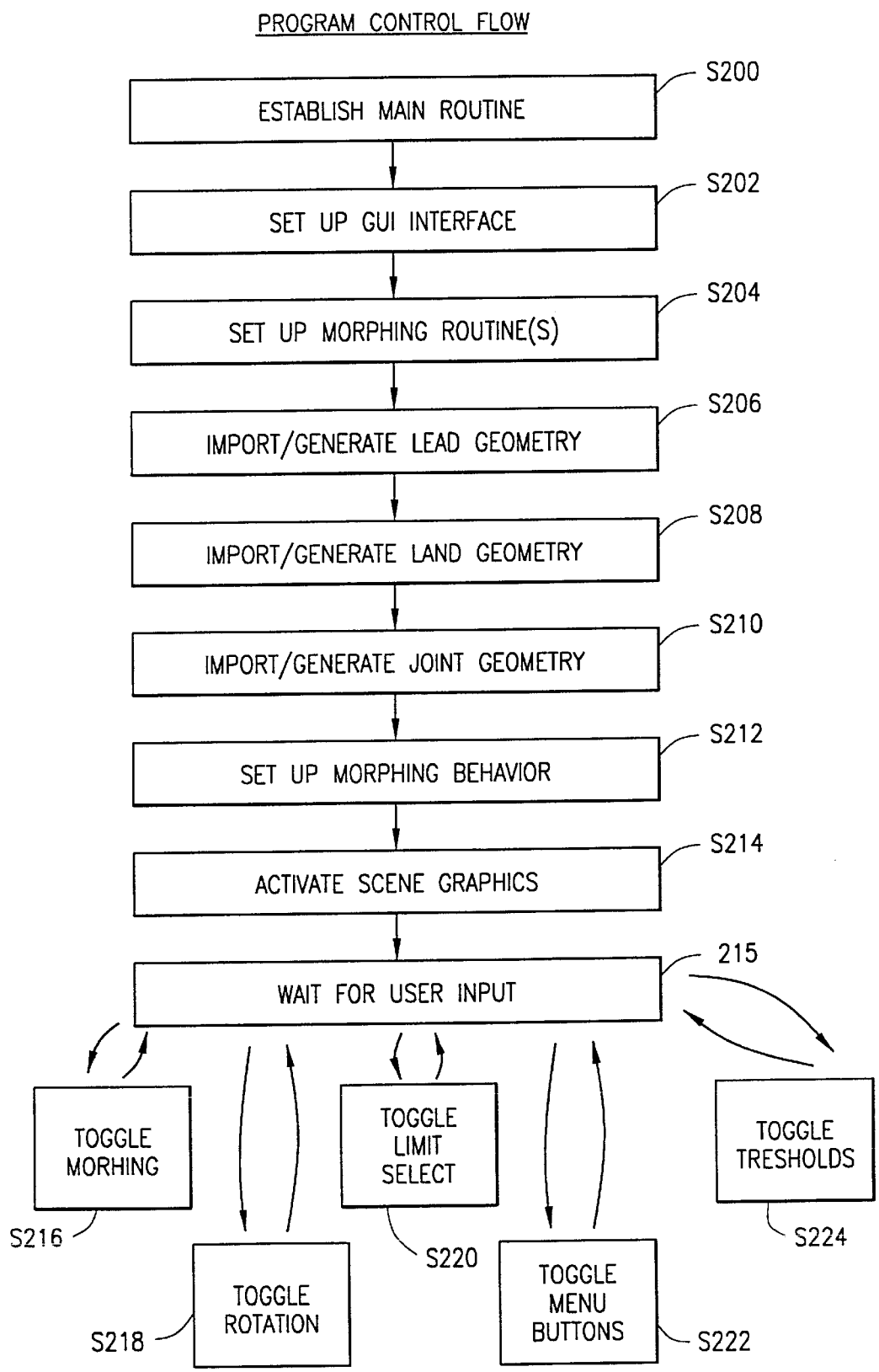
FIG. 2 depicts a program control flow chart of a method and/or software of an exemplary embodiment in accordance with the present invention.

FIG. 2 depicts an exemplary program control flow utilized by an exemplary apparatus such as apparatus 10. The program control flow is basically a software system control of the program and apparatus associated with setting the allowable tolerances of a solder joint NOTE: The term "tolerances" means the maximum, minimum, or normal dimensions, densities, sizes, weights, fractures, anomalies, measurements, diameters, characteristics, thresholds, widths, heights or other measurable things related to inspection of an object.

The program control flow of an exemplary apparatus and method in accordance with the present invention is as follows:

Starting at step S200, the main program routine is established. This is the entry point to the program. Preferably the present exemplary invention is programmed in Java, but could also be programmed in C++, FORTRAN or a vast variety of programming languages that may or may not be object oriented. In Java programming, step S200 would be to instantiate a main class for the entry point of the program. The main portion can be the portion of the program which calls the routines and/or macros of the program.

Step S202 sets up the graphical user interface (GUI). Here the software sets up the buttons, sliders, window panes, etc., that a user will view while looking at the display 20. Note that steps S202 through S210 do not necessarily have to happen in the order indicated in FIG. 2. These steps S202–S210 can occur in substantially any order.

The GUI of the exemplary embodiment can be varied. It is understood that the GUI should, at a minimum, contain controls for displaying various three dimensional views of an object of interest, controls for morphing the object, and controls for storing user prescribed tolerances based on the morphed object. Morphing, short for metamorphosing, refers to a changing of form technique in which one image is gradually turned into another. In an exemplary display there are radio buttons, sliders, regular buttons, checkable boxes, a table of items, menu items, and a display window for displaying an image of an object (e.g. a solder joint of interest). Note also that an 'object' is the physical device or item occurring in the real world; an 'image' or 'depiction' is a representation of the object which is rendered on the display device; and a 3D image is a three-dimensional rendering of the image on the display device.

FIGS. 4, 5, 6 and 7 depict exemplary GUIs. The exemplary GUIs depict the types of graphical user interfaces that a user may want or need to set up and use the present invention. Referring to FIGS. 4, 5, 6, and 7 each figure depicts a graphical user interface 400, 500, 600 and 700 viewed in the display portion of screen 20. The GUI(400, 500, 600, and 700) allows the user to visually set tolerances for various attributes related to the displayed object. The user does not have to completely understand the threshold/tolerance (i.e. values displayed numerically in the threshold chart 450. By being able to view the maximum and minimum allowable extremes the user can set the tolerances visually using the GUI. The tolerances are then read from the morphed display object and sent as data files to the inspection machine where physical solder joints (objects) are inspected by automated equipment that determines whether the inspected solder joints (objects) fall within or outside the tolerances prescribed.

The menu items 402 across the top of GUI may include "FILE", "HELP", "JOINT TYPE", "GEOMETRY MODE", and "SHOW LIMITS".

The FILE 404 can be utilized for saving, opening or starting new files or setting up a printer. The HELP 406 can be utilized to pull down help information to aid the user to navigate through an operation. One of ordinary skill in the art would understand the usage of these GUI buttons.

The JOINT TYPE 408 can be utilized to pull down a selection menu 702 of solder joint types (for example, gullwing, J-lead or ball grid array tools). It is understood that JOINT TYPE could also be "OBJECT TYPE" for a menu of the various types of objects that an exemplary inspection system 10 may be utilized for.

The GEOMETRY MODE 410 of the menu items 402 allows the user to select the method used to generate the object (solder joint) depiction. Solder joint depictions can be generated by several means including, Image, Simulated, Created, or Learned. For example, a solder joint image would be one that is a reproduction of a real world physical object which has been reproduced via some sort of an information capture device such as a camera, scanner, x-ray, or flying probe micrometer. A simulation would be a representation of an object that generates characteristics similar to the object. The characteristics may be modeled rather than measured directly from an object. Mathematical models could be created to simulate an object.

A created depiction would be a representation of an object by a person(s) (artist). It could be a drawing, painting, model, or drawn in a computer aided design program. A learned depiction would be a representation of an object in which a number of measured or imaged objects are mathematically combined together to generate the depiction.

Solder joint depictions can be generated and "simulated" by 3D graphic software packages or from mathematical constructs. All depictions can be created and stored. The simulated solder joint can be checked in the pull down menu 412.

The geometry mode 410 can be utilized in the pull down menu 412 to, for example, utilize a "learned" joint. A 3D rendition of an actual solder joint (object) can be generated using, for example, laminography to extract the geometry of a viewed physical solder joint. The geometry information is extracted to produce a 3D depiction of the learned solder joint. A single solder joint can be used or a plurality of joints (a collection) can be viewed and have their geometry extracted and then averaged or normalized to determine what a typical solder joint of the same type would look like in three dimensions. The averaged data could then be imported into the exemplary embodiment 10.

A user could select STANDARDS in the pull down menu 412 to depict objects with standard dimensions for a good/acceptable solder joint. The pull down menu 414 depicts some sample standard types that can be utilized to provide guidelines on how to configure the tolerances of a solder joint. The pull down menu 414 may have a submenu to show minimum and maximum tolerances.

Figure 7:
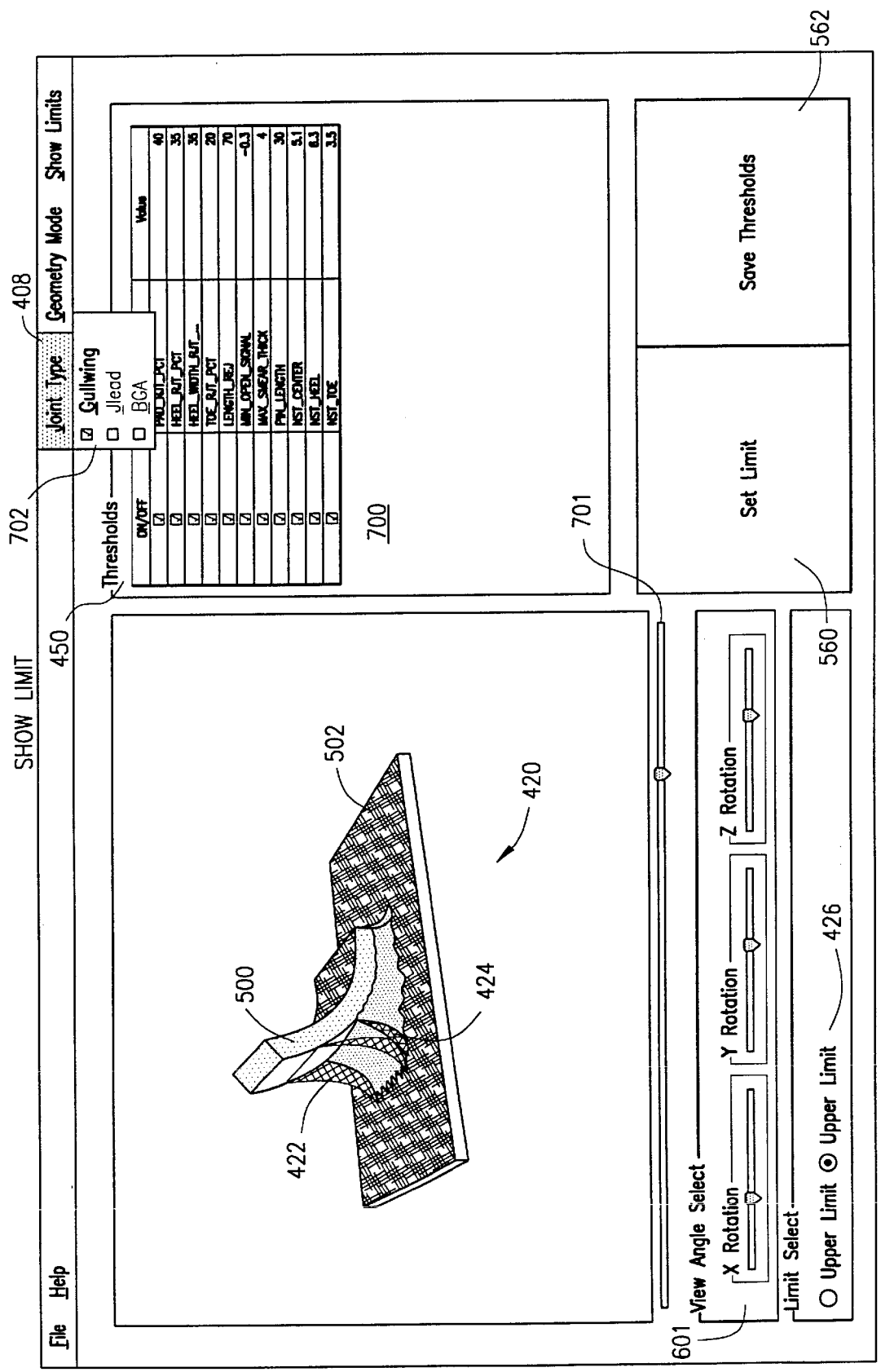

The SHOW LIMITS 416 item is on the menu item 402. FIG. 7 depicts a show limits exemplary display of a solder joint (object) 420 where maximum 422 and minimum 424 solder fill tolerances are shown for the depicted gullwing solder joint.

The pull down menu (not shown) for the SHOW LIMITS 416 menu item will allow the user to select a view of both upper and lower limits (tolerances) depicted in FIG. 7 or to select or show only the designated upper limit (FIG. 6) or lower limit (FIG. 4) as designated by the limit select buttons 426.

The exemplary GUI 400, 500, 600 and 700 can include a threshold or threshold table 450 which provides a listing of the various tolerances associated with the selected solder joint. Check boxes can be used to select which of the threshold values (tolerances) will be displayed in the object 420 and/or utilized in the algorithms. Color coding or gray scale can be used such that the various threshold items are displayed and viewed in different colors on the depicted solder joint 420. For example, some of the thresholds correspond to statistical process control measurements. Some of them correspond to an acceptable distance the lead 500 can be from the pad 502, others may correspond to the alignment of the solder joint and others may correspond to dimensions related to the size or the amount of solder permitted. There are a multitude of tolerances that can be viewed and set using the 3D visualization and associated software of the present exemplary embodiment. Solder joint volumes can be calculated and measured, angular distances and misalignment ranges can be set and quickly viewed or edited by an operator.

On the right side of the threshold chart 450 is a value column. The tolerance or threshold value (i.e. physical quantification parameter) can be inserted by the exemplary software by reading measurements from the object 420 or the tolerance value can be inserted manually by the user.

When the user has morphed the displayed object to acceptable maximum limits, the user can use the SET LIMITS button 560 to read all the threshold/tolerance information (i.e. physical quantifiable parameters) off the displayed solder joint 420 and import the tolerance numbers/units to the value portion of the thresholds chart 450 for review or manipulation by the user.

Figure 5:
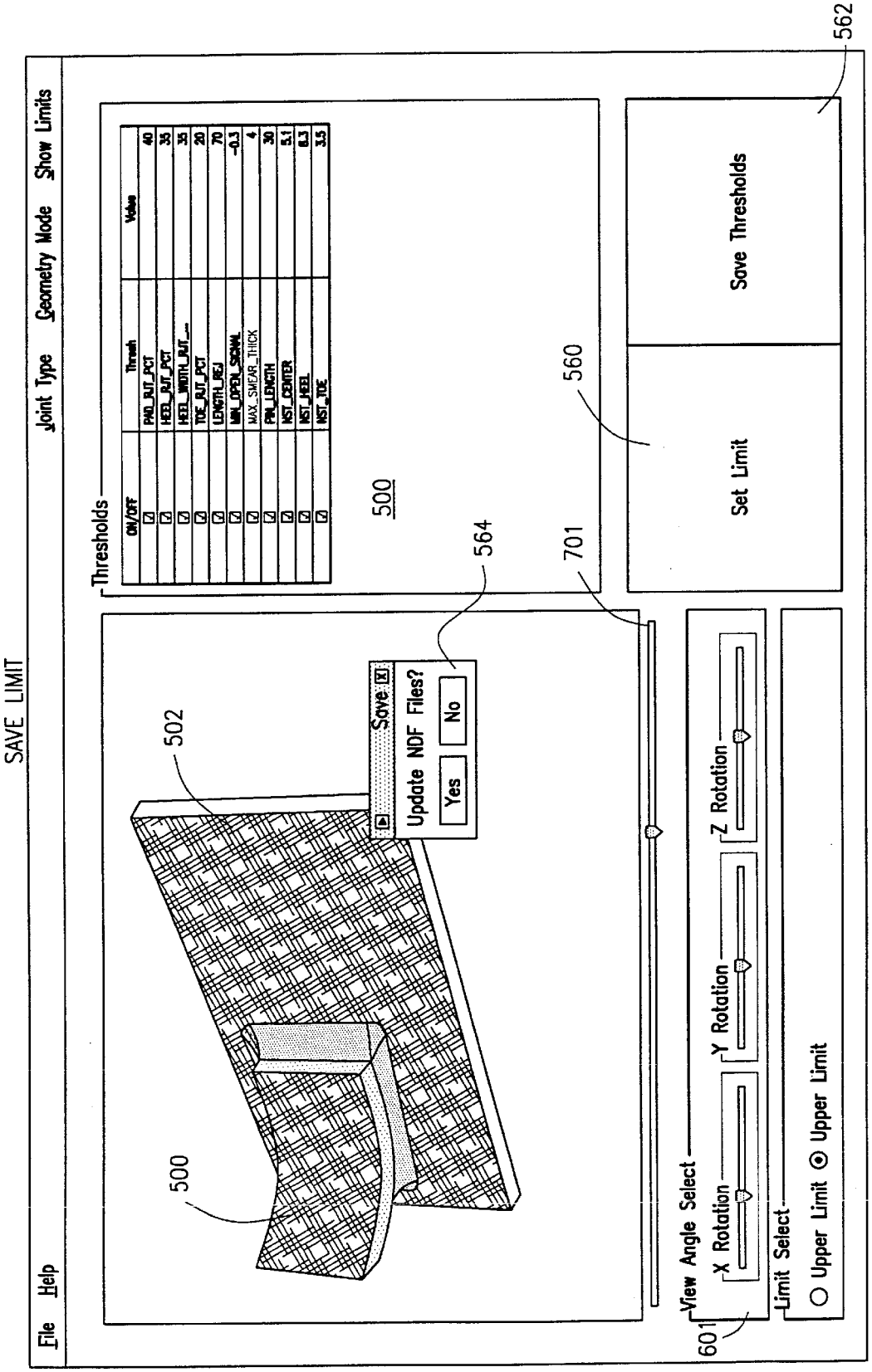
Figure 6:
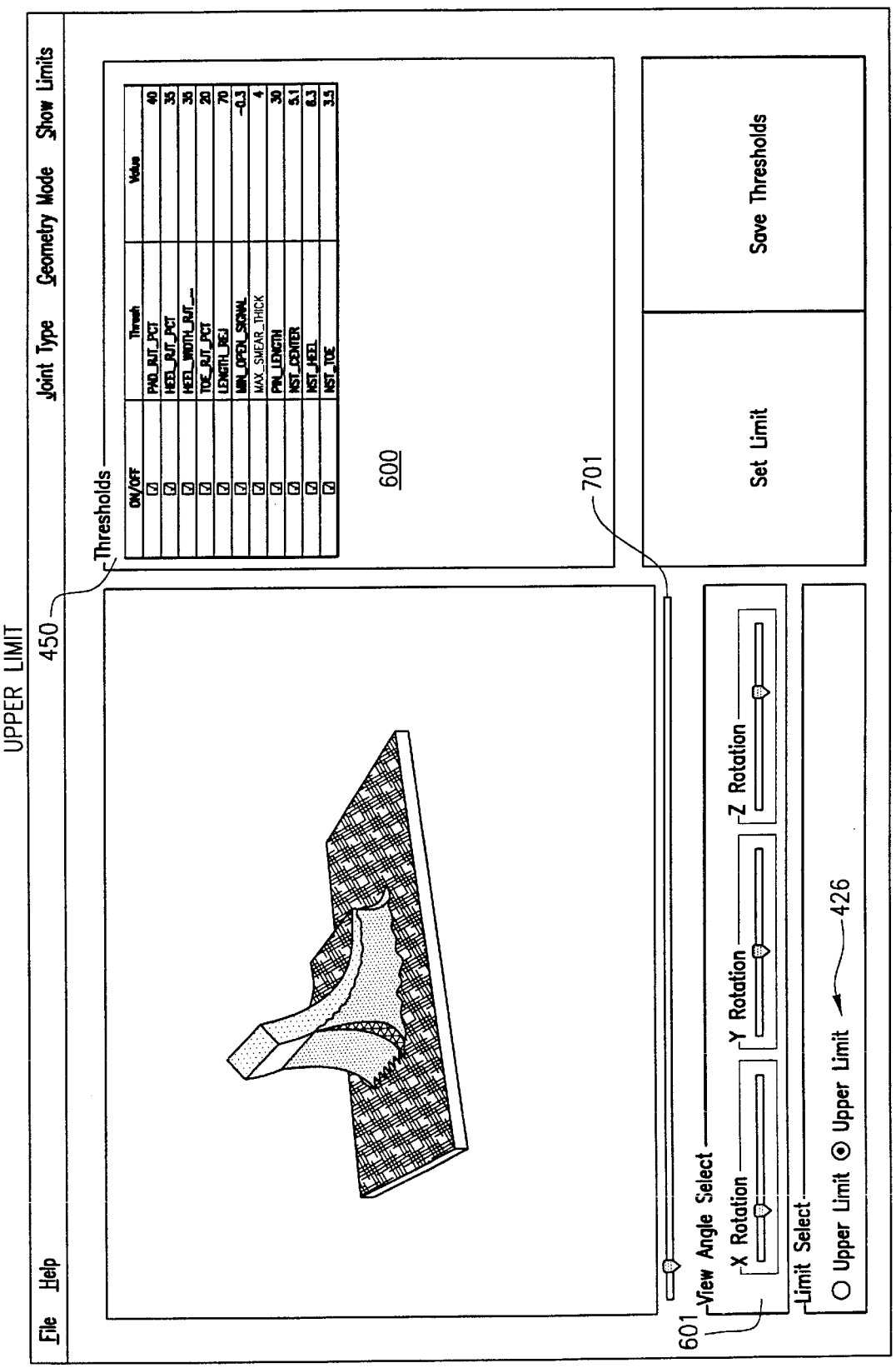

The SAVE threshold button 562 brings up a dialog box 564 shown in FIG. 5 which requests the user to respond "yes" or "no" to saving the threshold/tolerance values for the displayed solder joint (object) 420 to one or more files used by a solder joint inspection device such as the one shown in FIG. 1. The files are used by the inspection or test machine to determine if the solder joints (objects) it images are within the tolerances defined by the user.

Figure 4:
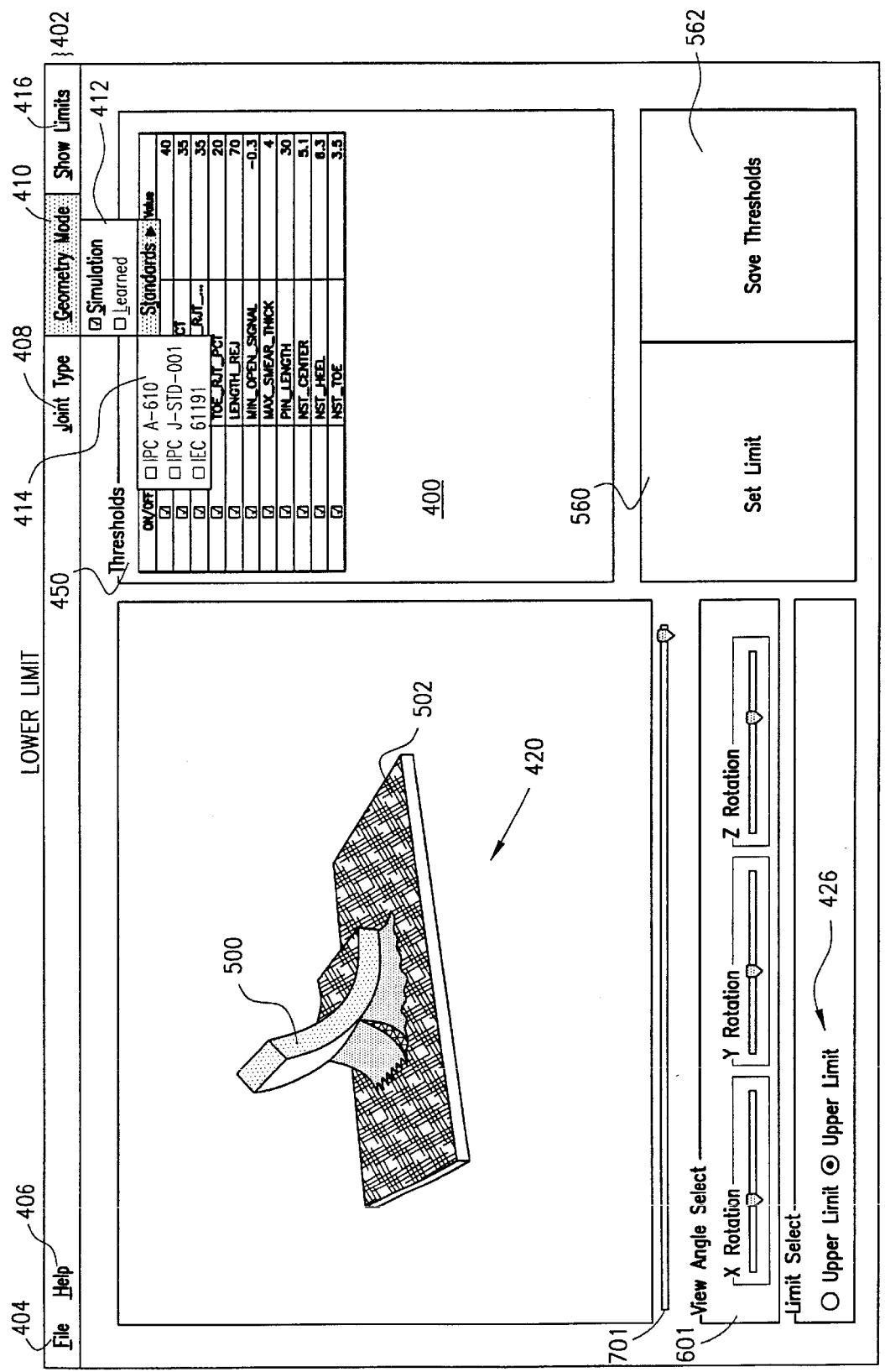
FIGS. 4, 5, 6 and 7 depict exemplary programmer interface displays of a exemplary embodiment of the present invention.

The VIEW ANGLE SELECT portion 601 provides exemplary slider controls that correspond to X, Y and Z axis rotation of the viewed object 420. The various FIGS. 4 and 5 depict objects rotated to different three dimensional view angles.

The slider bar 701 directly underneath the displayed object 420 can be used for one or more morphing techniques. The slider bar 701, for example, can be utilized to morph the joint such that the lead 500 moves farther or closer to the land 502.

Furthermore, other items can be incorporated into the exemplary GUIs. For example, a user could "click" on a threshold item in the threshold chart 450 and the slider bar 701 can be moved to effect a change of the particular tolerance on the displayed object 420. Another item that could be included is the addition of a two dimensional or three-view (top, front, side) figure of the joint type on the display screen for the user's reference.

Returning now to FIG. 2, in step S204 the morphing routine(s) are set up and/or instantiated. In other words, for example, in the Java programming language there is a class that performs morphing calculations. For example, end points and an intermediate point associated with the morphing routine can be provided and the morphing class performs the geometry and interpolation calculations so that a visually smooth morph is performed.

In steps 206, 208 and 210 the geometry for the joint, lead and land (pad) are loaded. It is understood that the geometry for any object that is to be inspected or relationship between objects that are to be inspected would be imported/generated and/or loaded into the program at this time. The geometry of the objects or parts that are going to be connected, attached and/or inspected are loaded for use by the program.

In step S212 the morphing class of step 204 is enabled so that its behavior interacts correctly with the geometry classes such that the object moves/morphes correctly. This step 212 must come after the morphing routine S204 and the geometry steps S206, S208 and S210 are completed.

Step S214 activates the scene graphics. It takes the information generated from the preceding steps and provides it to the graphical user interface for display on the display screen. In effect, the items, such as sliders and buttons on the GUI will now move or operate when the user interacts with them. The sliders and buttons on the GUI will effect operations of the 3D image movement, views and rendering.

At step S215 the system waits for the user to interact with the keyboard or pointing system associated with the GUI. Steps S216, S218, S220, S222 and S224 correspond to the GUI interfaces that the user can utilize in conjunction with the main routine, and at least the GUI interface to set, change, view, and adjust the inspection tolerances of a displayed object. The user can perform morphing of the object in step S216 by moving the slider 701 back and forth.

Rotation of the viewed object can be performed in step S218 by the moving of the X, Y or Z rotation controls 601.

The toggle limit select S220 handles the user selection of the upper or lower limit buttons in the limit select 426 portion of the GUI. When selected, the user adjusts via slider 701 the limits of the selected button for a selected threshold item.

The TOGGLE MENU BUTTONS S222 handles control and interaction of the user with the items on the menu bar 402, such as FILE, HELP, JOINT TYPE, GEOMETRY MODE, and SHOW LIMITS. The toggle thresholds S224 handles the interface of the threshold table 450 wherein thresholds chart can be displayed or not displayed, adjusted manually or highlighted on the displayed object.

The exemplary embodiments allow a user to display and see a three dimensional representation of an object, adjust, set and view tolerance values related to the object and convey the tolerance information to an inspection device for use in a non-destructive inspection and test of an actual manufactured item. The set-up of the inspection tolerance parameters can be performed more quickly then with old two dimensional systems or manual data intensive systems. The present exemplary embodiments allow for a variety of tolerances (upper, lower and other limits) of an object to be adjusted, viewed and set at the same time while a representation of the three dimensional object is being displayed and viewed.

Figure 3:
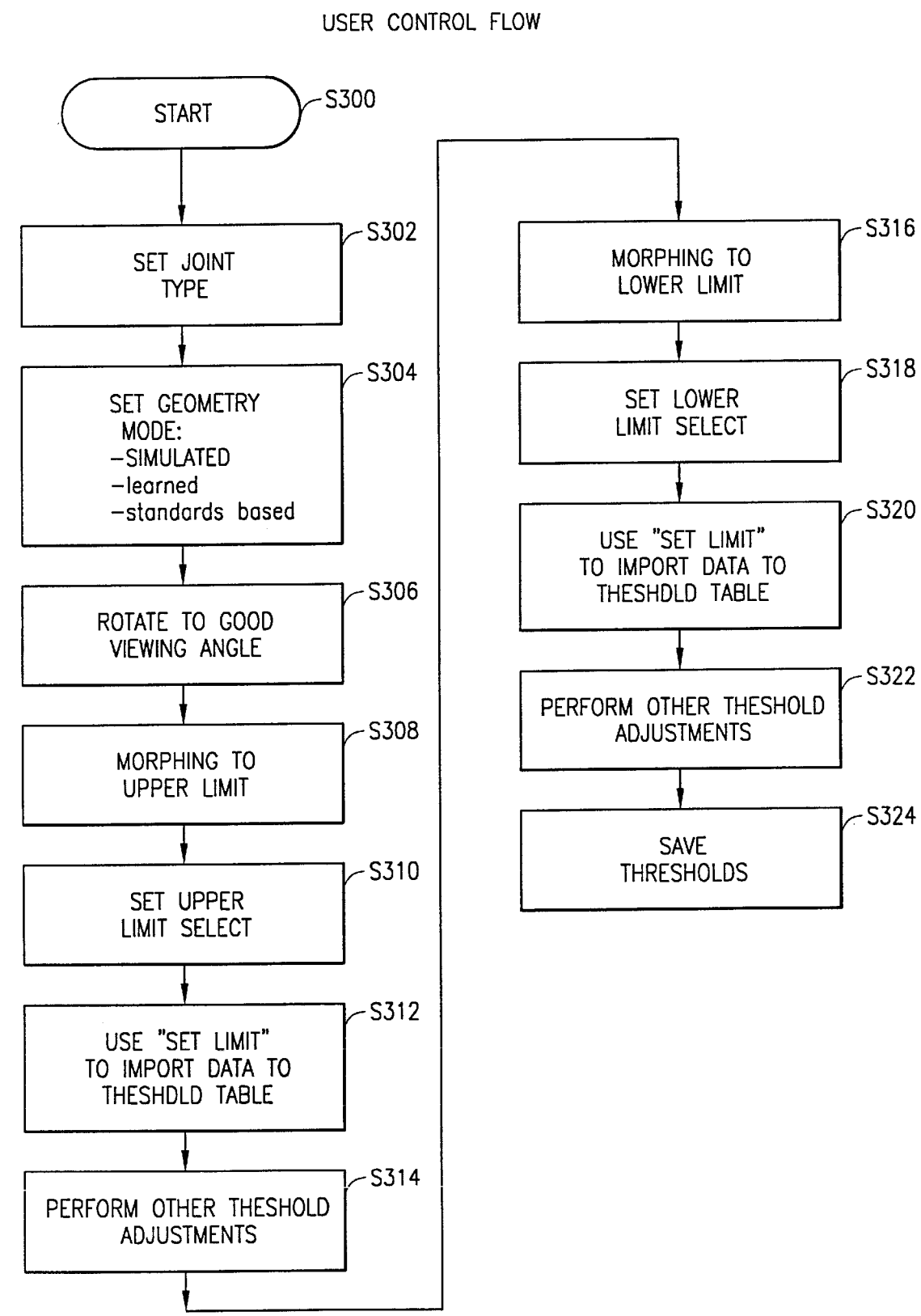
FIG. 3 depicts a user control flow chart of a method and/or software that is in accordance with an embodiment of the present invention.

Referring now to FIG. 3, a user control flow is depicted which describes how a user may utilize an exemplary apparatus and method to set up the inspection tolerances of a particular object such as a solder joint.

At step S300 the user starts an interaction with an exemplary apparatus and the program starts. The order of some of the following steps is not necessarily important. At step S302 the user can select a joint type for which the tolerances need to be established. At step S304 the user selects a geometry mode. That is, whether the displayed joint will be a simulated joint, learned joint or standard based joint.

Again, it is understood that a user may perform the set geometry step S304 before or after the set joint type step S302.

The imaged and depicted object or solder joint can then be rotated by the user in step S306 about the X, Y or Z axis in order to obtain an adequate viewing angle wherein the portion of interest of the solder joint or object can be seen.

The rotation can be accomplished by, for example, the slider controls on the GUI or by any other adequate means provided.

The imaged and depicted solder joint can then be morphed in step S308 to set the upper limits or tolerances that would be acceptable for an actual solder joint. Once the depicted solder joint has been morphed to acceptable upper limits, the user may set the upper limit select in step S310. (Note that step 310 could precede step 308) By setting the upper limit select the user is holding or storing the upper tolerances and limits in a temporary storage within the apparatus while the user performs other tasks. The user can then use the set limit button to import upper limit data or tolerances extracted from the morphed solder joint into the threshold chart where the tolerances and data can be viewed numerically by the user in step S312.

The user can then perform other tolerance, adjustments manually in the threshold chart by, for example, manually adjusting a threshold value in step S314. It is understood that the above steps can be revisited or performed in different orders by the user. In essence the user selects an object to be displayed in three dimensions on the display, sets the upper limit and lower limit tolerances that would be acceptable from a quality control perspective, and saves the data read from the three dimensionally displayed object.

Steps S316 through S322 repeat the above steps for setting the acceptable lower limit tolerances.

Once all the necessary tolerances are set and/or viewed on the display in association with the displayed object the user can save the thresholds in step S324. Here the upper and lower tolerances, limits, thresholds, etc., are stored to a file that is utilized by the test and inspection machine which will actually view "real life" physical objects such as solder joints and determine whether the viewed solder joints are within or outside of the acceptable tolerances as defined by the user.

Note that it is easy, using the present exemplary embodiments, for a user to go back and change parameter tolerances using the present invention without having to fully understand interrelationships of various parameters. The user may not be required to enter a single numerical value for a tolerance. Instead, the user can "eye-ball" acceptable tolerances using a three dimensional, scalable display of an object to be inspected or tested.

The present invention can be adopted for use in various industries including inspection of electronics, pharmaceuticals, manufactured parts, welding joints of any kind, manufacturing of plastic, glass, metallic, naturally occurring objects, or other products. Furthermore, inspection in the food industry or almost any product producing industry for items that should be rejected due to shape, size or color can also be accomplished.

X-ray, sonic, ultrasonic, infrared, visible light, temperature, weight, or other techniques for imaging an actual object can be utilized. The exemplary embodiments of the present invention may be incorporated into a an Agilent Automated Process Test System-5DX.

The exemplary apparatus provides a novel and useful method for setting and reviewing the settings of solder joint geometry. It has a utility for setting and reviewing thresholds and tolerances for analyzing joints (or virtually any quality controlled item) in a manufacturing repair loop. It can also be utilized for training personnel about inspection and testing of a manufactured or classifiable item. The exemplary embodiments encapsulate a number of elements, including visualization of a solder joint using 3D techniques, setting threshold limits visually by morphing the solder joint between upper and lower bounds, and incorporation of standards information into the threshold and tolerance settings. The notion of 3D visualization to establish specifications for inspection can encompass various manufacturing arenas. Indeed, any numerical attributes that must be set for performing x-ray or other types of inspection can utilize 3D visualization to convey the meaning of the attribute to a user and to help automatically determine the numerical attributes and its value. Consequently the present exemplary methodology can be extended to PCBA alignment, surface mapping, defect review, paperless repair efforts, user training, and diagnostic efforts in the PCB manufacturing, testing and repair industry.

The present exemplary embodiments and methods alleviate many difficulties of prior PCBA inspection testing set up by providing a 3D representation of a solder joint which may be morphed to desired inspection limits. Tolerances are then measured directly from the solder joint depicted on a display screen rather than input by a user/programmer. The user/programmer still has an ability to override these read tolerances and manually input tolerances if necessary.

By providing upper and lower limits as well as the solder joint in a 3D representation, the user/programmer may immediately see the relationship of the joint to the limits. This is useful both for setting initial tolerances and also for substantially eliminating the need for tolerance tuning. Setting tolerance limits using the teaching of the present invention is much faster and simpler than the current manual numerical entry technique. Furthermore, using the exemplary techniques and methods to visualize the relationship of joints in a data set to establish acceptable manufacturing limits may help a user to setup thresholds and tolerances more effectively and thereby result in a more accurate high quality finished product.

Although various preferred embodiments of the invention have been shown and described, it will be appreciated by those skilled in the art that changes may be made to these embodiments without departing from the principles and the spirit of the invention, the scope of which is defined in the appended claims.

What is claimed is:

1. An apparatus for translating human visual inspection analysis of a physical object into parameters for use by an inspection device, said apparatus comprising:

a display device for displaying a multi-dimensional depiction of said physical object;

controls for manipulating and morphing said displayed multi-dimensional depiction of said physical object;

a memory for storing parameters associated with said physical object, said parameters being extracted from a manipulated and morphed version of said displayed multi-dimensional depiction of said physical object, said parameters including maximum and minimum allowable dimension tolerances; and a test device which utilizes said parameters associated with said physical object when inspecting another physical object in real life to aid in the determination of whether said another physical object is within said parameters.

2. The apparatus of claim 1, wherein said controls for manipulating include a graphical user interface.

3. The apparatus of claim 1, wherein said controls include:

a first control for displaying a plurality of parameters that can be adjusted and for selecting specific parameters to be adjusted on said multi-dimensional depiction.

4. The apparatus of claim 3, wherein said specific parameter is highlighted on said multi-dimensional depiction.

5. The apparatus of claim 2, wherein said controls include:

a second control for morphing a selected parameter.

6. The apparatus of claim 2, wherein said controls include:
a third control for rotating said multi-dimensional depiction about a display axis so that a user can view a specific portion of said multi-dimensional depiction.

7. The apparatus of claim 2, wherein said controls include:
a fourth control to initiate extractions of parameters from said displayed multi-dimensional depiction.

8. The apparatus of claim 1, wherein said parameters include upper and lower tolerances.

9. The apparatus of claim 1, wherein said test device inspects said physical object using at least one of an x-ray, infrared, ultraviolet, radiation, thermal, optical and electromagnetic techniques.

10. A method of setting tolerances using at least three dimensional visualization, said tolerances being utilized by an amorphously shaped physical object inspection apparatus, said method comprising the steps of:

initializing a program which provides a graphical user interface;

selecting an amorphously shaped depiction for which tolerances are to be set using said graphical user interface;

displaying said amorphously shaped depiction on a display screen in at least a three dimensional manner;

rotating said amorphously shaped depiction to a viewing angle;

morphing a tolerance associated with said amorphously shaped depiction to an upper limit;

saving upper limit data;

morphing said tolerance associated with said selected amorphously shaped depiction to a lower limit;

saving said lower limit data; and providing said upper limit data and said lower limit data to said amorphously shaped physical object inspection apparatus, wherein said apparatus further comprising a test device which utilizes said upper limit data and said lower limit data when inspecting another amorphously shaped depiction in real life to aid in the determination of whether said another amorphously shaped depiction is within said upper limit data and said lower limit data.

11. The method of claim 10, wherein said steps of selecting, rotating, morphing and saving can be performed in various orders.

12. The method of claim 10, wherein step of initializing includes the steps of:

setting up said graphical user interface;

setting up morphing routines;

loading geometry for objects that can be selected in said selecting step;

setting up morphing behavior; and waiting for user input via said graphical user interface.

13. The method of claim 10, wherein said step of selecting further includes a step of selecting whether said depiction is one of a simulated depiction, a learned depiction, and a standards based depiction.

14. The method of claim 10, wherein said depiction is a solder joint.

15. The method of claim 10, further comprising the steps of:

imaging an amorphously shaped physical object with said object inspection apparatus;

extracting both real time physical upper limit data and real time physical lower limit data from said imaged amorphously shaped physical object;

comparing said real time physical upper limit data with said upper limit data; and comparing said real time physical lower limit data with said lower limit data.

16. The method of claim 10, wherein the step of saving comprises the step of extracting data from said depicted object and then providing said extracted data to a memory device.

17. The method of claim 10, wherein a user does not have to enter numerical information related to said tolerance.

18. The method of claim 10, further comprising a step of selecting said tolerance from a plurality of tolerances associated with said selected object.

19. A three-dimensional display system enabling a user to view, set, and adjust acceptable tolerance data associated with an actual solder joint, said three-dimensional display system comprising:

a display device for displaying a selected depiction of a stored solder joint image to a user, said selected depiction being displayed three-dimensionally; and a graphical user interface which enables a user to three-dimensionally view tolerance data associated with said stored solder joint image, said graphical user interface further adapted to enable a user to morph said selected solder joint image in order to adjust and save said tolerance data without necessarily having to physically enter numerical tolerance data, wherein said saved tolerance data includes maximum and minimum allowable dimension tolerances; and a test device which utilizes said saved tolerance data for said stored solder joint image when inspecting another solder joint image in real life to aid in the determination of whether said another solder joint image is within said saved tolerance data.

* * * * *